Oct. 20, 1964 T. B. HUTCHINS IV 3,153,581

LARGE AREA CONNECTION FOR SEMICONDUCTORS AND METHOD OF MAKING

Filed Nov. 21, 1960

INVENTOR.
Thomas B. Hutchins IV

BY
Buckhorn, Cheatham & Blore

ATTORNEYS

United States Patent Office 3,153,581
Patented Oct. 20, 1964

3,153,581

LARGE AREA CONNECTION FOR SEMICONDUCTORS AND METHOD OF MAKING

Thomas B. Hutchins IV, Beaverton, Oreg., assignor to Tektronix, Inc., Beaverton, Oreg., a corporation of Oregon Filed Nov. 21, 1960, Ser. No. 70,784
7 Claims. (Cl. 29—194)

This invention relates to a large area connection and method of making and more particularly to a method of producing a large area connection between elements of rigid material, which connection is of high mechanical strength and has sufficient flexibility that repeated stresses such as those caused by temperature fluctuations of the materials being connected, where such materials have different thermal coefficients of expansion, have no deleterious effect upon the connection. The present invention is especially useful for making large area ohmic connections between elements of metal and elements of semiconductor material but is also useful for making large area connections between elements of other rigid materials.

The connections of the present invention include thermo-compression bonds between the surfaces of the elements being joined. Such bonds are known in the prior art and are produced by pressing surfaces of the elements to be joined together under high pressure and temperature conditions followed by cooling and release of the pressure. Usually such bonds are produced in a reducing or inert atmosphere such as hydrogen or nitrogen, argon or helium, although with certain materials suitable bonds are produced in the air or other oxidizing atmosphere. The temperatures employed are below the melting points of any of the materials being joined and also below temperatures which will cause fusing of any eutectic which may tend to form between the contacting surfaces being bonded together. There is therefore no layer of fused material formed during bonding. The resulting bonds are extremely thin and are apparently limited to the surface layers of atoms of the two members being joined.

The above described thermo-compression bonds can be employed to secure together surfaces of elements made of the same or different metals or semi-metals including germanium, silicon and semiconductor intermetallic alloys. Also in some cases it is possible to bond such materials to the surfaces of nonmetallic crystalline or amorphous hard materials of relatively high melting point. Where temperature variations are a factor, large area thermo-compression bonds between rigid materials have, for practical purposes, either been limited to connecting two members of the same material which two members therefore have the same thermal-coefficient of expansion. Otherwise such bonds have been limited to very small areas since large area bonds between dissimilar materials fail when subjected to repeated temperature changes. For purposes of this application, small area connections are considered to be connections which are substantially point contact connections while large area connections extend over areas which are many times greater than those of such point contact connections.

In accordance with the present invention, large area connections can be produced between surfaces of elements to be connected by forming a large number of small area thermo-compression bonds between each of the two elements being connected and a flexible structure positioned between such elements and providing flexible members joining such small area bonds. This is accomplished by positioning between the surfaces of two elements to be connected a woven screen of fine wire having meshes which are small relative to the area of the connection being made and then subjecting the assembly to compression bond forming conditions of the type discussed above. Thus, the two elements being connected are pressed toward each other to force the surfaces of such elements into contact with the wires of screen. The assembly is heated to an elevated temperature which is sufficient to form a thermo-compression bond but which is substantially below the melting temperature of any of the materials of the screen or the elements being connected and also below that which will form a fused layer between any of the surfaces in contact with each other. If the surfaces of the members being joined are parallel to each other throughout the area of the connection, the woven structure of the screen provides a large number of spaced small areas of contact between the wires of the screen and such surfaces. High unit pressures are easily obtained at such areas of contact and a large number of thermo-compression bonds of small area are thereby easily formed in the larger area of the connection. The fine wires of the screen form flexible members which extend angularly between the surfaces of the elements being connected and the resulting structure has high mechanical strength and does not break down under varying temperature conditions even though the two elements have considerably different thermal coefficients of expansion.

As stated above, the present invention is particularly useful for forming large area ohmic connections between metal elements and elements of semiconductor materials, such as those employed in transistors and semiconductor diodes or rectifiers. In semiconductor devices capable of handling substantial amounts of electric power, it is desirable to make large area electrical connections to the semiconductor materials so that such connections will carry electric currents of considerable magnitude without overheating. Also at least certain of such connections should be ohmic connections as opposed to P-N junctions. Such connections should also desirably act as efficient heat conductors so that the semiconductor devices can effectively be associated with heat sinks or to cooling systems which will remove unwanted heat from the devices. By employing a screen made up of fine metallic wires and having small meshes and positioning such screen between parallel surfaces of a member of semiconductor material and a metal plate or strip member and then producing a plurality of small area thermo-compression bonds in the manner described above, a mechanically strong ohmic connection is readily formed. The metal of the screen and of the metal plate can have relatively high electrical and thermal conduction properties so that effective electrical and heat conducting connection is provided.

It is, therefore, an object of the present invention to provide an improved method of making a large area connection to a surface of a member of rigid material and to provide an improved resulting connecting structure.

Another object of the invention is to provide a method of making large area connections between surfaces of elements of rigid material in which a large number of spaced thermo-compression bonds of small area are provided in a larger area and such bonds to the two elements are connected to each other by a flexible structure capable of absorbing stresses which would otherwise be applied to said bonds.

Another object of the invention is to provide a method of making a large area connection between elements of rigid material, which connection is of high mechanical strength and has good electrical conducting properties and which provides large number of small resilient or flexible members bonded to the two elements and extending angularly between the surfaces of the two elements to provide a stress absorbing structure.

Another object of the invention is to provide a method of making large area ohmic connections between elements of rigid semiconductor materials and metal elements in which flexible or resilient elements of a woven wire screen are bonded to the surfaces of such elements on opposite sides of such screen by a large number of thermo-compression bonds of small area at the points of contact between the wires of the screen and such surfaces.

A further object of the invention is to provide an improved ohmic connection between a rigid semiconductor material and a metal element in which such elements have surfaces connected together through a large number of small angularly extending flexible or resilient elements bonded at spaced points to such surfaces.

Other objects and advantages of the invention will appear in the following description of a preferred embodiment of the invention given in connection with the attached drawing of which:

Figures 1, 2:
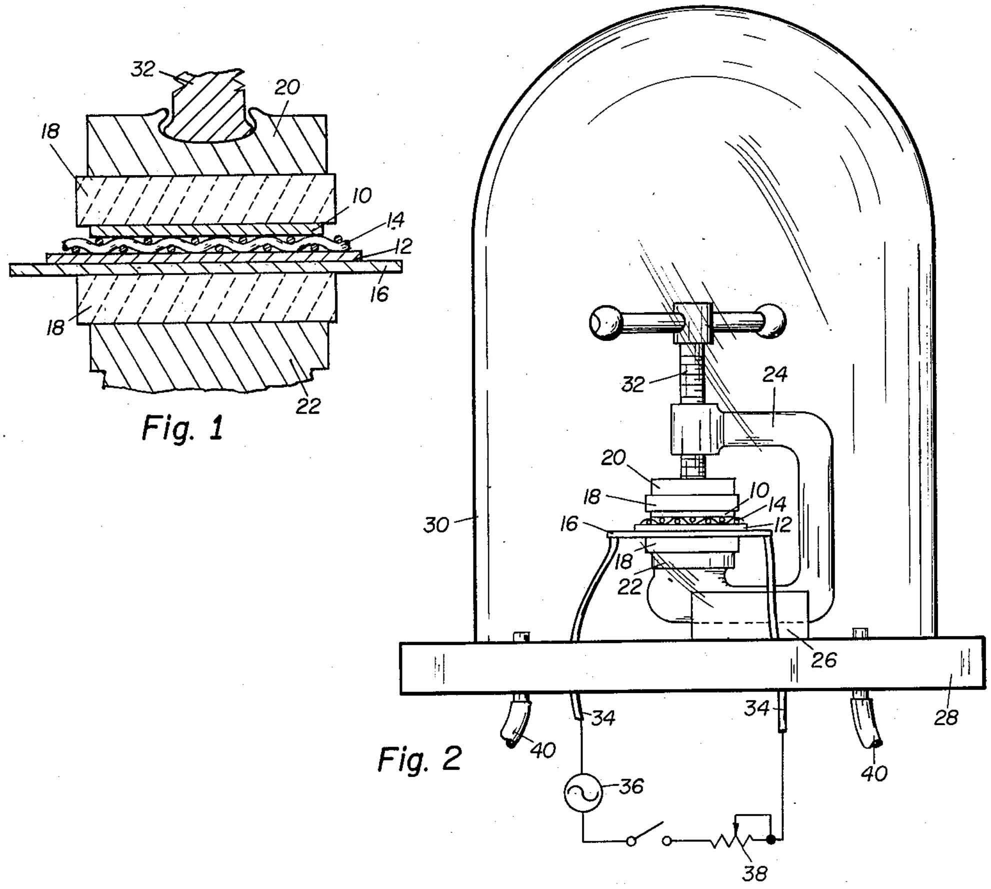
FIG. 1 is a cross section on a very much enlarged scale of an assembly employed in making a large area connection in accordance with the present invention.
FIG. 2 is a somewhat diagrammatic elevation of an apparatus which may be employed in producing large area connections in accordance with the present invention.

Referring more particularly to the drawings, FIG. 1 shows an assembly including a first element 10 of rigid material which, for example, may be silicon either in the pure state or having a controlled amount of impurities added thereto to form either a P type or an N type semiconducting material. The silicon element 10 may be a small plate of any desired outline. Another element of rigid material 12 such as an element of molybdenum is positioned abjacent the member 10 and a woven wire screen 14 of a suitable resilient or flexible metal is placed between the adjacent surfaces of the elements 10 and 12. Such adjacent surfaces are lapped or otherwise treated to provide plane parallel surfaces and are then etched or otherwise cleaned to provide clean areas of contact between such surfaces and the surfaces of the wires of the screen 14. The screen 14 is also preferably thoroughly cleaned, such as by a solvent degreasing operation or by an etching operation or both. In order to provide for heating of the elements 10 and 12 and of the screen 14, a member 16 of conducting metal is positioned in contact with one of the elements 10 or 12, such as the element 12.

The assembly thus described is positioned between members 18 of refractory heat insulating material, such as members of alumina. The resulting assembly is then placed between opposed metal plate members 20 and 22 forming part of a C-clamp 24 shown in FIG. 2. The assembly made up of the elements 10 and 12 and the members 18 is clamped between the members 20 and 22 by a screw-threaded clamping element 32 forming part of the C-clamp 24. The resulting assembly is then positioned upon a support member 26 resting upon a closure plate 28 for a bell jar 30 and electrical connections are made between opposite ends of the heating member 16 and wires 34 extending through the plate 28 and connected to a source 36 of electrical power in series with a rheostat 38. The bell jar 30 is then placed in position after which an inert gas or a reducing gas can be introduced into the bell jar through one of the tubes 40 and air exhausted through the other tube until a desired atmosphere is formed in the bell jar 30.

Since the element 10 to which the connection is to be made may be of hard, brittle material and the refractory material of the members 18 may also be quite brittle, it is desirable that the contacting surfaces of all of the various elements 10 and 12 and members 18, as well as the clamp members 20 and 22, be made to fit each other with precision, for example, by grinding or lapping such surfaces flat and parallel, in order to distribute the clamping force over such surfaces. It is important that the surfaces of the elements 10 and 12 in contact with the screen 14 also be substantially parallel with each other so that the pressures applied to the various small contacting areas with the screen 14 are substantially uniform. The clamp 24 is tightened until relatively high unit pressures are produced at the small areas of contact and such pressure may be sufficient to slightly deform the rounded portions of the wire in contact with the surfaces of elements 10 and 12 but insufficient in and of itself to cause bonding by "cold welding." The unit pressure thus provided at the small areas of contact with the screen is sufficient to form thermo-compression bonds with the elements of the screen in a subsequent heating operation. The unit pressure between the other relatively large contacting surfaces of the various elements and members is not, however, sufficiently great to form such bonds.

Figure 3:
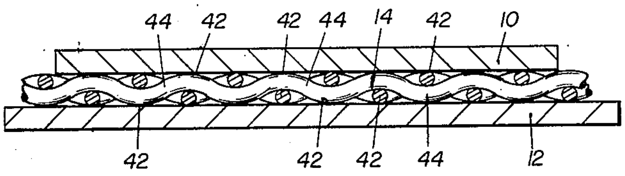
FIG. 3 is a vertical section on a very much enlarged scale of the resulting product.

Upon flowing a heating current through the conducting member 16 from the source 36, the elements to be bonded together, namely the elements 10, 12 and 14, are raised to a temperature which produces the thermo-compression bonds above discussed. The heating current is then discontinued and the elements allowed to cool under pressure and in the atmosphere under the bell jar. Thereafter the bell jar 30 is removed and the clamp 24 released. The resulting product is shown on a greatly enlarged scale in FIG. 3. Such product consists of the two elements 10 and 12 bonded to the screen 14 by a large number of small area compression bonds 42 between the surfaces of the members 10 and 12 and the wires of the screen. It will be noted that the wires run generally angularly to the surfaces of the members 10 and 12 to provide short flexible or resilient connecting members 44 between the bonds 42 at the surfaces of the elements 10 and 12, respectively.

As a specific example, the element 10 may be a small plate of silicon, for example, a disc ⅛-inch in diameter and 0.02-inch thick. The element 12 may be a slightly larger plate of molybdenum of approximately the same thickness and the member 16 a strip of molybdenum of similar thickness. The screen may be a 200 mesh nickel screen which provides approximately 150 small area thermo-compression bonds in the area of a circular plate of silicon ⅛-inch in diameter. The wires of a 200 mesh nickel screen are approximately 0.0021-inch in diameter so that the size of the wires of the screen 14 in the drawing is exaggerated relative to the thickness of the elements 10 and 12 so far as the present specific example is concerned. Such wires form a large number of flexible stress absorbing members extending from one element being connected together to the other between the small area bonds to such elements.

Molybdenum was selected for the element 12 to which the silicon element 10 is connected by the nickel screen 14 and thermo-compression bonds because the thermal coefficient of expansion of the molybdenum is not greatly different from that of silicon, such coefficient for molybdenum being $5.1\times10^{-6}$ as compared to $7.1\times10^{-6}$ for silicon. Connections of the type above discussed can, however, be made between members having considerably greater differences between their thermal coefficients of expansion, although the nearer their respective thermal coffiecients of expansion approach each other, the more stable the connection.

In the above specific example, the assembly of the silicon element 10, the molybdenum element 12 and screen 14 can, for example, be heated to 600° C. in a hydrogen atmosphere and then allowed to cool down for a period of 20 minutes in such atmosphere after which the pressure is released.

While employment of a nickel screen to connect a silicon element to a molybdenum element has been given for purposes of illustration, similar bonds can be produced with a wide variety of other materials. For example, the element 10 can be substantially any other rigid semiconductor materials such as germanium or any of a large number of inter-metallic compounds, examples of which are gallium arsenide, indium antimonide, aluminum arsenide, aluminum phosphide, aluminum antimonide, gallium phosphide, and cadmium or selenide telluride. The metals to which the semiconductor elements are connected by the screen may, in addition to molybdenum, be such metals as tungsten, tantalum, copper, iron, platinum or substantially any other metal which is stable and of sufficiently high melting point. Thus such metals as well as the semiconductor materials or other materials being bonded should have a melting point substantially above 400° C. and preferably at least 1000° C. The metal of the screen may also be selected from any one of a large number of metals having melting points sufficiently high as just discussed. Such metals preferably have at least a small amount of malleability so as to be slightly deformed when pressed between the elements to be joined. Such metals in addition to nickel may, for example, be copper, iron, platinum, gold or silver. In general, thermo-compression bonds can be formed at temperatures ranging from approximately 400° C. to 1000° C., depending upon the materials employed. It will be apparent that all of the materials employed in a given bonding operation must have melting points substantially above the temperature employed in such operation in order to avoid fusion of such materials. Also any eutectic which may tend to form at the contacting surfaces between any two of the materials should have a melting point substantially above such temperature. The eutectic temperature of nickel-silicon eutectic is about 1000° C., while for gold-germanium eutectic it is 356° C.

It will also be apparent that the large area connections of the present invention are not limited to those between elements of the dimensions given in the specific example or to the employment of screens having 200 meshes per inch. Thus connections of smaller size than one ⅛-inch in diameter may be produced and also connections of very much larger area and also such connections are not limited to circular areas. Also screens having meshes per inch ranging between approximately 60 and 400 can be employed.

While the specific description thus far has been with respect to forming ohmic connections with semiconductor materials, it is apparent that similar connections can be formed between two metals as shown by the fact that thermo-compression bonds form at the surface of the molybdenum strip where it is in contact with the nickel screen in the specific example above descrbed. It is, therefore, possible to form large area connections between two members of the same or different metals if such connections are desired for any purpose, and it is even possible to form large area connections which include thremo-compression bonds between metal screens and certain nonmetallic rigid materials such as diamond, crystalline or fused quartz and high melting point glass or ceramic materials. Thus plates of rigid or brittle glasslike or ceramic materials may be connected to each other through large area connections of the type described herein, even though they have considerable difference in their thermal coefficients of expansion.

I claim:

1. The method of making a large area ohmic contact with a surface of a first element of rigid monocrystalline semiconducting material including a plurality of thermo-compression bonds, which method comprises, positioning against said surface and extending over said area one side of a woven metal wire screen having meshes which are small relative to said area and of a malleable metal, positioning against the other side of said screen a surface of a second element of a metal with said surface of said second element extending parallel to said surface of said first element over said area, pressing said elements toward each other to compress said screen therebetween and force small areas of the metal of said screen into contact with said surfaces with pressure insufficient to produce bonds by cold welding, while maintaining said pressure heating said screen and at least said surface of said member to an elevated temperature less than the melting point or eutectic temperatures of the materials of said elements, said pressure and temperature being such as to be sufficient to cause bonding of said screen to said elements, maintaining said pressure and temperature for a period sufficient to effect the formation of a bond between said screen and said elements, thereafter cooling the resulting structure and finally releasing said pressure.

2. The method of making a large area ohmic contact with a surface of a rigid silicon element including a plurality of thermo-compression bonds, said method comprising, positioning against said surface and extending over said area one side of a woven screen of nickel wire having meshes which are small relative to said area, positioning against the other side of said screen one surface of a molybdenum element with said surface of said molybdenum element extending parallel to said surface of said silicon element over said area, positioning a molybdenum strip against the other surface of said molybdenum element, clamping the resulting assembly between elements of refractory heat insulating material to force small areas of the nickel of said screen into contact with said surfaces of said elements, the pressure of said clamping being elevated but insufficient to produce bonds by cold welding between said screen and said elements, passing an electric heating current through said strip to heat said screen and elements to a temperature below 1000° C. to form a plurality of thermo-compression bonds between said elements and said screen, said pressure and said temperature being such as together to effect a bonding of said screen to said elements without fusing of any material during the bonding process, cooling the resultant structure and releasing said clamping.

3. In a semiconductor device, a large area connection structure comprising an element of rigid crystalline semiconductor material, and a metal member having a plurality of projections each of which is small relative to the area of said connection and having one side thereof directed toward a surface of said element and extending over said area, at least some of said projections on said side of said member being bonded to said surface of said element by a plurality of bonds including no fused material so that the connections formed by said bonds are ohmic and collectively said bonds provide a large area connection between said screen and said semiconductor element.

4. A method of making a large area connection to an element of rigid crystalline electrical semiconductor material, comprising the steps of:

positioning a metal member having a plurality of spaced projections with said projections in contact with said element;

pressing said member against said element with a force which exerts an elevated pressure on said projections below the minimum pressure necessary to cause bonding between said member and said element by pressure alone; and heating the compressed member and element to an elevated temperature below the melting temperatures of the materials of said element and said member and below the eutectic temperature of any eutectic which may be formed by said materials so that no liquid phase of said materials is formed during heating, said temperature and pressure being sufficient to effect bonding of the contacting areas of said member and said element without the formation of a layer of fused material in said bond.

5. A method of making a large area ohmic connection between an element of rigid monocrystalline electrical semiconductor material and an element of polycrystalline electrical conductor material, comprising the steps of:

positioning a flexible metal member having a plurality of spaced projections, between said elements with at least some of said projections in contact with said elements, the contact area of each of said projections being small relative to the area of said ohmic connection;

pressing said elements toward each other with a force which exerts pressure on said projections insufficient of itself to cause bonding between said member and said elements;

heating the compressed member and elements above the temperature required to produce a plurality of thermocompression bonds between the projections on said member and said elements, but below the melting temperatures of the materials of said elements and said member and below the eutectic temperature of any eutectic which may be formed by said materials so that no liquid phase of said materials is formed; and terminating said pressing and said heating steps after said thermocompression bonds are formed to provide said large area ohmic connection.

6. A method of making a large area ohmic connection between an element of rigid monocrystalline electrical semiconductor material selected from the group consisting of germanium, silicon, gallium arsenide, indium antimonide, aluminum arsenide, aluminum phosphide, aluminum antimonide, gallium phosphide, cadmium telluride and selenide telluride and an element of electrical conductor material, comprising the steps of:

positioning a flexible metal member of wire screen having a plurality of spaced projections, between said elements with at least some of said projections in contact with said elements, the contact area of each of said projections being small relative to the area of said ohmic connection;

pressing said elements toward each other with a force which exerts pressure on said projections insufficient of itself to cause bonding between said member and said elements;

heating the compressed member and elements above the temperature required to produce a plurality of thermocompression bonds between the projections on said member and said elements but below the melting temperatures of the materials of said elements and said member and below the eutectic temperature of any eutectic which may be formed by said materials so that no liquid phase of said materials is formed;

maintaining said force and said temperature for a period sufficient to effect formation of a bond between each said projection and the area of said elements contacted thereby; and terminating said pressing and said heating steps after said thermocompression bonds are formed to provide said large area ohmic connection.

7. A semiconductor device comprising:

an element of monocrystalline semiconductor material having a surface;

a metal element of material having a coefficient of expansion different than that of said semiconductor material;

said metal element having a surface facing said semiconductor element surface and parallel thereto;

a woven wire screen of a malleable metal disposed between said elements;

said screen contacting said elements only at the apices of the reversely curved portions of the loops of the wires of said screen;

the contacting areas of said screen being bonded to said elements;

said areas of said screen contacting said semiconductor element being bonded directly to said semiconductor element by bonds including no fused material;

whereby said screen has ohmic connections to said semiconductor element, the wires of said screen form flexible connectors between said elements to compensate for variance in the thermal expansion of said elements, and the multiple number of areas of contact in total provide a relatively large area of contact between said elements to permit relatively large current flow therebetween.

References Cited in the file of this patent

UNITED STATES PATENTS

| | | |
|---|---|---|
| 220,908 | Arbogast | Oct. 28, 1879 |
| 1,731,218 | Adams | Oct. 8, 1929 |
| 1,838,781 | Moulton | Dec. 29, 1931 |
| 2,372,929 | Blessing | Apr. 3, 1945 |
| 2,389,238 | Phillips | Nov. 20, 1945 |
| 2,423,870 | Blessing | July 15, 1947 |
| 2,690,409 | Wainer | Sept. 28, 1954 |
| 2,691,815 | Boessenkool | Oct. 19, 1954 |
| 2,746,139 | Pappelendam | May 22, 1956 |
| 2,814,717 | Hardesty | Nov. 26, 1957 |
| 2,874,453 | Losco | Feb. 24, 1959 |
| 2,925,650 | Pall | Feb. 23, 1960 |
| 3,029,559 | Treptow | Apr. 17, 1962 |